United States Patent

Pedersen

[11] Patent Number: 6,048,145
[45] Date of Patent: Apr. 11, 2000

[54] DEVICE FOR REGULATION OF TENSION

[76] Inventor: Kurt Pedersen, 5095 Vlset, Rollandslia 112, Norway

[21] Appl. No.: 08/930,223
[22] PCT Filed: Apr. 9, 1996
[86] PCT No.: PCT/NO96/00080
 § 371 Date: Oct. 6, 1997
 § 102(e) Date: Oct. 6, 1997
[87] PCT Pub. No.: WO96/31363
 PCT Pub. Date: Oct. 10, 1996

[30] Foreign Application Priority Data

Apr. 7, 1995 [NO] Norway ................................. 951384

[51] Int. Cl.$^7$ ........................................... B60P 7/08
[52] U.S. Cl. ............................. 410/100; 410/96; 410/97; 267/153
[58] Field of Search ................... 410/12, 96, 97, 410/99, 100, 103; 24/68 CD, 68 CT, 265 CD, 129 D

[56] References Cited

U.S. PATENT DOCUMENTS

| 2,364,081 | 12/1944 | Lambert . | |
| 2,628,397 | 2/1953 | Olson | 410/103 |
| 3,043,902 | 7/1962 | Klein | 24/129 D X |
| 3,250,527 | 5/1966 | Ramsey . | |
| 3,957,285 | 5/1976 | Schlaeger | 410/100 |
| 4,314,783 | 2/1982 | Parnell et al. | 410/34 |
| 4,360,299 | 11/1982 | Nadherny et al. | 410/100 X |
| 4,373,841 | 2/1983 | Adler et al. | 410/100 X |
| 4,573,842 | 3/1986 | Mantela et al. | 410/23 |
| 4,757,979 | 7/1988 | Essex . | |
| 4,901,402 | 2/1990 | Begemann | 24/129 D |

FOREIGN PATENT DOCUMENTS

| 2907683 | 9/1980 | Germany . |
| 143326 | 10/1980 | Norway . |

*Primary Examiner*—Stephen T. Gordon
*Attorney, Agent, or Firm*—McAulay Nissen Goldberg Kiel & Hand LLP

[57] ABSTRACT

A securing element is constructed of a solid elastic block having a pair of longitudinally extending bores. A pair of chain links are passed through each bore and are connected at the ends to fastening rings. Upon tensioning of the lengths of chain links, the block is compressed while the effective length of the length of chain links increases slightly.

12 Claims, 4 Drawing Sheets

DEVICE FOR REGULATION OF TENSION

The present invention relates to an arrangement of securing elements for regulating tension forces in the elements.

The present invention is especially concerned with securing arrangements which are employed for securing freight, such as containers and the like to a base such as a loading area on a vehicle, the deck on a vessel or the like. In such cases, the securing arrangement generally comprises a chain linkage consisting of a number of rings of dissimilar construction. Such a chain linkage is fastened to the freight and to the base and is tightened in order to prevent the freight from moving, for example at bumps in the road or when the vessel swings in heavy seas. Even if the chain linkages are lashed tightly tension forces occur when the base moves, and this will result in strong tugs on the chain linkage, and each link will gradually become more and more stretched and deformed until possible breakage occurs. For this reason such chain linkages must often be replaced.

Many devices with springs and elastic elements are known which dampen such tugging actions by compression parallel to the tugging action.

U.S. Pat. No. 4,757,979 describes a tension regulating apparatus for regulating tension by the compression of a yieldingly resisting core. As described, a collapsible modifier is arranged in a compressible core and reacts when a force transmitting member applies a compression force to the core when reacting to an applied tension force. In particular, the collapsible modifier is described as a compression-modifying link mechanism 18 in the form of a parallelogram, together with a compression means 16. The compression means 16 is connected to connecting links 12,13 and surrounds the core 14. When the links 12, 13 are exposed to tugs the compression means links 16 on each side of the core tend to compress or collapse the compressible core 14 with the built-in link mechanism 18. This means that the links 16 move towards each other and make possible an accompanying small lengthening of the link in the longitudinal direction. The core material 14 counteracts the compression together with the link mechanism. Thereby the tugging action in the links is dampened, and the wear and tear over time becomes much less.

The disadvantage with this known construction is that there is a big danger of wear and tear on the rubber material when the link mechanism moves inside the core. It is therefore doubtful whether this solution will have satisfactory durability over longer periods.

It is an object of the present invention to produce an arrangement which will completely or partially eliminate tug damage on a chain linkage.

Briefly, the invention provides an arrangement for damping tugs in a securing element wherein the arrangement includes a solid elastic block having a pair of longitudinally extending bores, a pair of linkage sections, each of which extends longitudinally through a respective bore in the block and a pair of fastening rings. Each ring is fastened to a respective end of each pair of linkage sections to transmit a pulling force to the pair of linkage sections and to direct the respective ends of the linkage sections toward each other. In this respect, the linkage sections move toward each other within the block to resiliently compress the block therebetween in response to pulling of the rings in a direction away from each other.

The arrangement according to the invention is used for coupling together bodies which can be mutually moved, for securing freight to loading areas on vehicles and on board vessels, for moorings, tows, and during the coupling together of ponds at sea.

The invention is to be described further in the following description having regard to a concrete example, and with reference to the accompanying drawings, in which.

Figure 1:
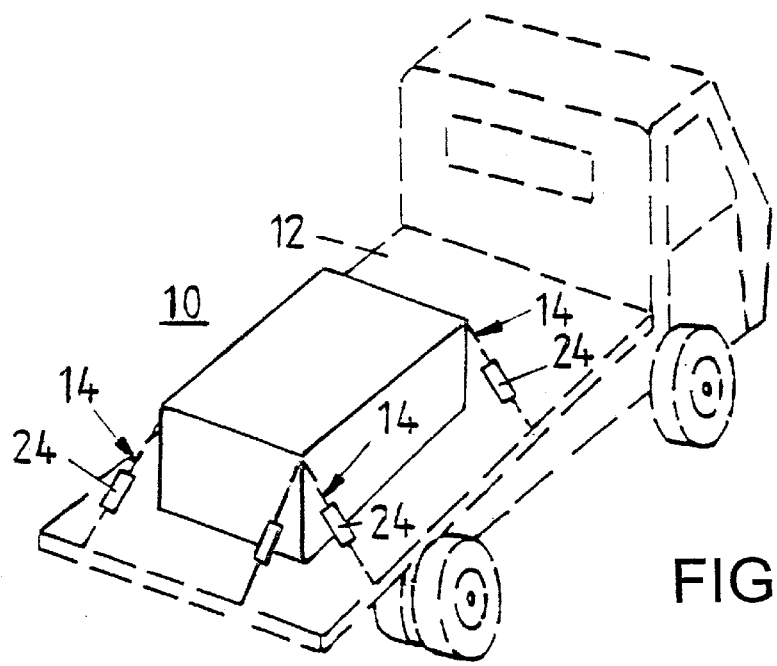
FIG. 1 shows a perspective view of a container which is to be secured to a movable base by means of the arrangement according to the invention.

With reference to FIG. 1 of the drawings, a container 10 which is arranged on a movable base 12, such as a loading area on a vehicle, the deck on a vessel or the like, is anchored to the base 12 by means of a number of chain linkages 14. A section, for example a central section of each linkage 14 as shown in the 2 comprises two parallel extending linkage sections 16,18 which are led through separate bores 20,22 in a solid elastic block 24 (also designated a core 24). The bores 20,22 can be so spacious that each linkage section 16,18 lies freely within its bore.

The bores are parallel as shown in the Figure but can also be formed with mutual non-parallel paths. The bores preferably have circular cross-sections, but can have any other suitable form, such as oval or more polygonal cross-sectional forms.

Figure 2:
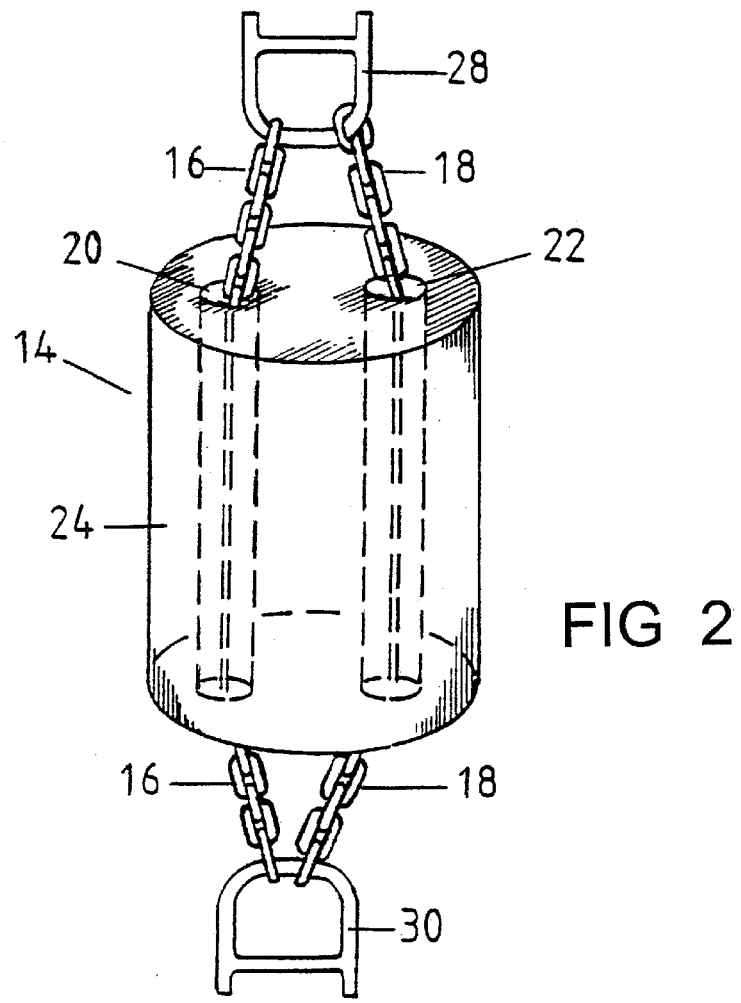
FIG. 2 shows a perspective view of the arrangement according to the invention.
Figure 3:
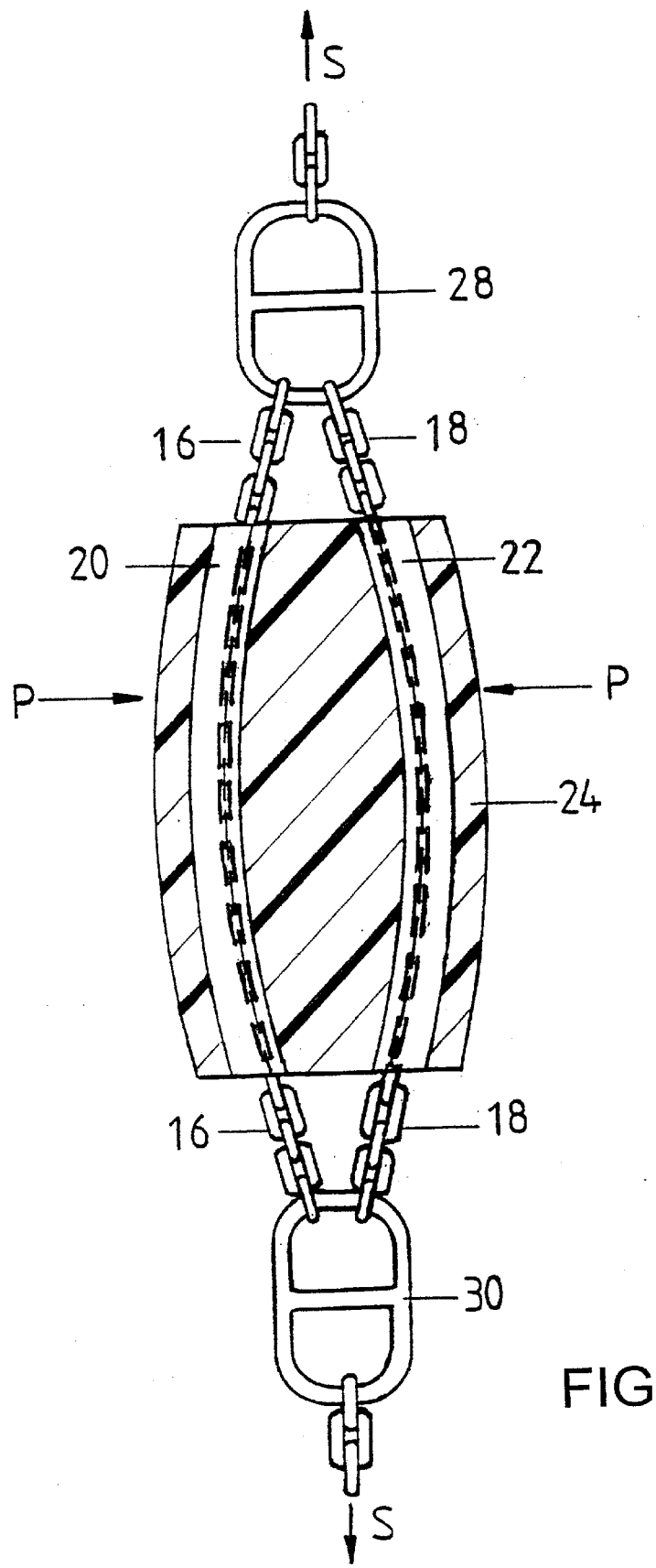
FIG. 3 shows a vertical section of the arrangement according to the invention.

At each end the chain linkage sections 16,18 are fastened to upper and lower ties via respective fastening rings 28,30, so that the two chain paths 16,18 form a substantially oval concave arc form where the concavities face towards each other. It is evident that the fastening rings have a rounded lower shape. As illustrated in FIGS. 2 and 3, the fastening rings 28, 30 serve to direct the respective ends of the linkage section 16, 18 toward each other.

The solid element in the form of the block 24 can have an arbitrary thickness and length, depending on the total length of the linkage and the field of use. Thus the block can be cylindrical as is shown in FIG. 2, or it can have a more rectangular block shape.

Preferably the block 24 is of hard rubber, such as neoprene or urethane based, but it can also be of plastic materials or another partially elastic material which can be compressed after which the material assumes its original form when the compression force ceases or decreases, that is to say that the material has so-called memory.

In the mounted position the chain linkage 14 is well tightened up between the deck and the freight. Now when a movement occurs of the freight there is a strong tug on the chains in the direction illustrated by the arrows S in FIG. 3. The linkage sections 16,18 will then be moved towards each other transversely of the direction of tension as shown by P, and the partially elastic rubber material is subjected to a compression which involves the whole chain length being gradually lengthened (that is to say over time), for example by 1 cm. This will be conducive to dampening the tugging effect on the linkage.

According to an alternative construction of the securing arrangement each bore can be designed as an undercut groove which extends inwardly from the surface of the block. With such a groove shape the chain linkage can be readily introduced into and withdrawn from the bore from the side.

Figure 4:
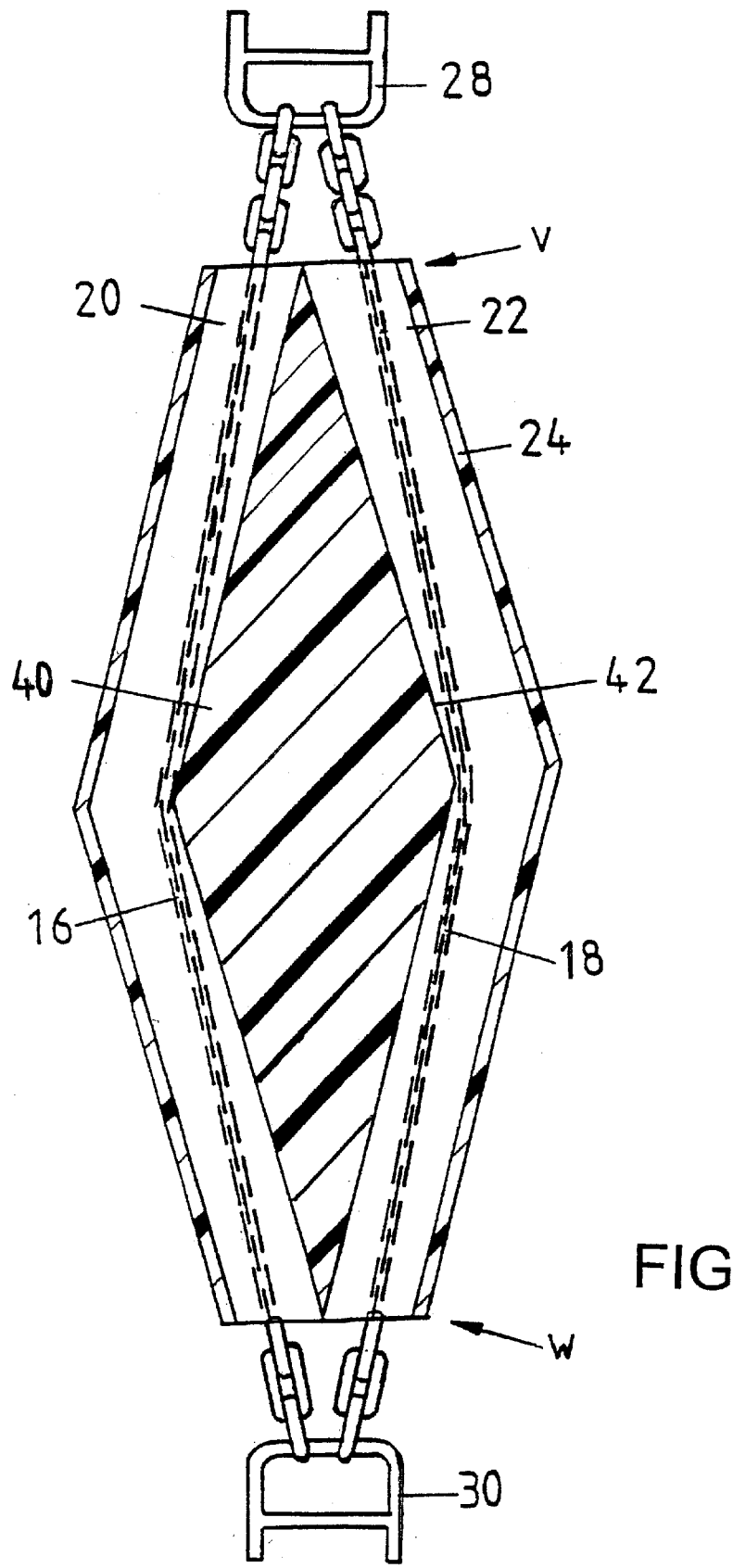
FIG. 4 illustrates a cross-sectional view of a second embodiment of an arrangement according to the invention.
Figure 5:
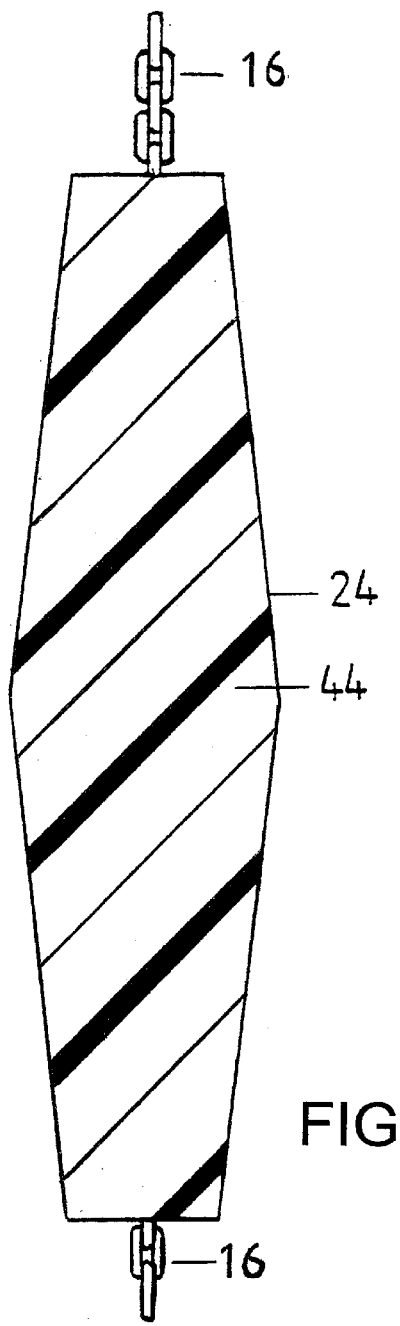
FIG. 5 illustrates a side view of the arrangement of FIG. 4.
Figure 6:
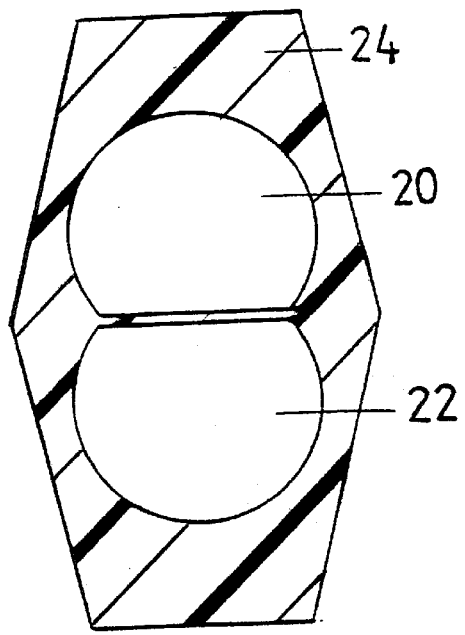
FIG. 6 illustrates an end view of the elastic block employed in the embodiment of FIGS. 4 and 5.

FIG. 4–6 show a preferred construction of a block element 24 in the form of a plane section, a side view, and a top view.

As is evident from FIG. 4 the block 24 has a largely rhombic plane section. The bores 20,22 are also largely rhombic viewed in plane section, and the bores or the ducts 20, 22 discharge at pointed ends V,W of the rhombic shape. The bores 20, 22 thus define a diamond shaped core therebetween. As is shown in FIG. 6, the entrances to the ducts/bores 20,22 of the block 24 are placed approximately adjacent to each other. It will be evident that together the chain linkage sections 16,18 also form an approximately rhombic contour. It is clearly an advantage that the corner region of the block 24, shown at 40,42 are rounded off so that the duct forms a largest possible contact area between chain and duct wall in the block material 24.

In order to avoid unnecessary wear and tear of the block material 24 (the core material 24) at the inlets to the bores 20,22, during bracing and tugging of the chain, the preliminary duct direction ought to be substantially parallel to the prevailing chain direction.

FIG. 5 shows that also in side view the block 24 can have an approximately rhombic design with cut off acute angle regions, together with a broader central portion shown at 44. However one is not tied to such a specific design of the block.

The securing element is described as a chain composed of a number of links. It is clear that the securing element can also comprise a line, such as wire, or cordage (braided) of natural and synthetic origin. That is to say the securing element may be of any type which can be used for coupling together bodies which can be mutually moved.

With the present invention there is produced a new and more effective arrangement for dampening tugs on chains, which often occur as a result of mutual movement between freight and base.

The arrangement according to the invention can be used for coupling together bodies which can be mutually moved, for securing freight to loading decks on vehicles and on board vessels, for moorings, anchorings, tows, and during coupling together of fishing ponds at sea.

I claim:

1. A securing element including
   a solid elastic block having a pair of longitudinally extending bores;
   a pair of linkage sections, each said linkage section extending longitudinally through a respective one of said bores in said block; and
   a pair of fastening rings, each said ring being fastened to a respective end of said pair of linkage sections to transmit a pulling force to said pair of linkage sections and to direct the respective ends of said pair of linkage sections toward each other whereby said linkage sections move towards each other within said block to resiliently compress said block therebetween in response to pulling of said rings in a direction away from each other.

2. A securing element as set forth in claim 1 wherein said bores in said block are parallel to each other.

3. A securing element as set forth in claim 1 wherein each bore has a cross-section selected from the group consisting of circular, oval and polygonal.

4. A securing element as set forth in claim 1 wherein said bores in said block define mutual non-parallel paths for said linkage sections.

5. A securing element as set forth in claim 1 wherein each bore is an undercut groove extending from a surface of said block for introduction of a respective linkage section therein from a side of said block.

6. A securing element as set forth in claim 1 wherein said block has a rhombic plane section and said bores define a diamond shaped core therebetween.

7. A securing element as set forth in claim 6 wherein said block has a rhombic shape in a plane perpendicular to said plane section.

8. A securing element as set forth in claim 1 wherein each linkage section is formed of chain links.

9. An arrangement for damping tugs in a securing element, said arrangement comprising
   a solid elastic block having a pair of longitudinally extending bores;
   a pair of linkage sections, each said linkage section extending longitudinally through a respective one of said bores in said block; and
   a pair of fastening rings, each said ring being fastened to a respective end of said pair of linkage sections to transmit a pulling force to said pair of linkage sections and to direct the respective ends of said pair of linkage sections toward each other whereby said linkage sections move towards each other within said block to resiliently compress said block therebetween in response to a tug on at least one of said rings.

10. An arrangement as set forth in claim 9 wherein said bores in said block define mutual non-parallel paths for said linkage sections.

11. An arrangement as set forth in claim 9 wherein each bore is an undercut groove extending from a surface of said block for introduction of a respective linkage section therein from a side of said block.

12. A securing element as set forth in claim 9 wherein said block is made of rubber.

* * * * *

UNITED STATES PATENT AND TRADEMARK OFFICE
CERTIFICATE OF CORRECTION

PATENT : 6,048,145
DATED : April 11, 2000
INVENTOR(S): KURT PEDERSEN

It is certified that error appears in the above-identified patent and that said Letters Patent is hereby corrected as shown below:

Column 2, line 22 change "the 2" to -Fig. 2-

Signed and Sealed this

Twentieth Day of March, 2001

Attest:

NICHOLAS P. GODICI

*Attesting Officer*     *Acting Director of the United States Patent and Trademark Office*